United States Patent
Maurer et al.

(10) Patent No.: US 8,017,778 B2
(45) Date of Patent: Sep. 13, 2011

(54) 2,9-DICHLOROQUINACRIDONE IN PLATELET FORM

(75) Inventors: Marc Maurer, Village-Neuf (FR); Niklaus Raetzo, Reinach (CH); Paolo Balliello, Marina di Pietrasanta (LU) (IT)

(73) Assignee: BASF SE, Ludwigshafen (DE)

( * ) Notice: Subject to any disclaimer, the term of this patent is extended or adjusted under 35 U.S.C. 154(b) by 329 days.

(21) Appl. No.: 12/513,422

(22) PCT Filed: Oct. 30, 2007

(86) PCT No.: PCT/EP2007/061657
§ 371 (c)(1), (2), (4) Date: May 4, 2009

(87) PCT Pub. No.: WO2008/055807
PCT Pub. Date: May 15, 2008

(65) Prior Publication Data
US 2010/0099877 A1    Apr. 22, 2010

(30) Foreign Application Priority Data
Nov. 9, 2006 (EP) .................... 06123789

(51) Int. Cl.
*C09B 48/00* (2006.01)
*C07D 471/02* (2006.01)

(52) U.S. Cl. .......................... 546/56; 106/497
(58) Field of Classification Search .................. 546/56; 106/497
See application file for complete search history.

(56) References Cited

U.S. PATENT DOCUMENTS
5,084,573 A    1/1992   Babler et al.

FOREIGN PATENT DOCUMENTS
EP          0466649 A1    1/1992

OTHER PUBLICATIONS

Farbe Und Lack, 77, 8, pp. 759-769, 1971.
Chemical Reviews, 67, 1, pp. 1-18 (1967), May 19, 2011.

*Primary Examiner* — Charanjit Aulakh
(74) *Attorney, Agent, or Firm* — Qi Zhuo

(57) ABSTRACT

The present invention is directed to a new 2,9-dichloroquinacridone in platelet form, a process for its preparation and its use for coloring high molecular weight organic material. The 2,9-dichloroquinacridone in platelet form has a length of 1 to 45 μm, a width of 0.1 to 20 μm and an average thickness of 0.01 to 5 μm and is characterized in that the hue-value h in remission is $\leq 31$ and/or the lightness L* in transmission is $\geq 20$ and/or a decreasing b* value and an increasing a* value from an illuminating and viewing angle (aspecular angle) 45°/110° (+25°) to 45°/90° (+45°).

16 Claims, 3 Drawing Sheets

A microphotograph of the 2,9-dichloroquinacridone in platelet form obtained in example 1 of the present application Angle dependent color change of two pigments in the CIELAB color space:

a) 2,9-dichloroquinacridone platelets obtained in ex. 1 of EP0466649 (_△_△_,...△...△...), b) 2,9-dichloroquinacridone platelets obtained in present example 1 (_O_O_,...O...O...).

X-ray diffraction pattern of the 2,9-dichloroquinacridone in platelet form obtained in example 1 of the present invention

2,9-DICHLOROQUINACRIDONE IN PLATELET FORM

The present invention is directed to a new 2,9-dichloroquinacridone in platelet form, a process for its preparation and its use for coloring high molecular weight organic material.

U.S. Pat. No. 4,370,270 describes a copper phthalocyanine of the β-modification in platelet form which is synthesized in the form of flakes of at least 10 μm in length and 3 μm in width. When incorporated in stoving varnishes, this pigment gives blue metal effect finishes.

Quinacridones, also referred to as 7,14-dioxo-5,7,12,14-tetrahydroquinolono (2,3-b)acridones are valuable pigments. Many patents describe the preparation of special transparent or opaque quinacridone pigment forms with particle sizes below 1 μm. Furthermore, linear 2,9-dichloroquinacridone of the following formula

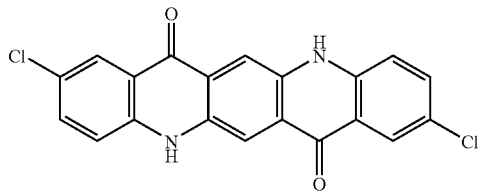

is known to exist in three polymorphic modifications (Chemical Reviews, 67, 1, 1-18 (1967)). The bluish red γ-modification is of primary commercial interest.

It is generally known that heat stable organic pigments can be sublimed at high temperatures. By heating 2,9-dichloroquinacridone powder to temperatures above 350° C., oversized thin crystals with a platelike structure of 2-3 μm thickness and 50-150 μm length were grown and their formation was scientifically discussed (Farbe and Lack, 77, 8, 759-769 (1971).

EP0466649 discloses that crude 2,9-dichloroquinacridone, known to exist in a needle prismatic particle form having a particle size of 0.1 to 5 μm, can be readily and efficiently converted into an "effect" pigment having a platelet-like morphology, by recrystallization in a polar solvent in the presence of a long chain thiol compound and a base. The resulting platelet form is said to provide excellent luster effects when incorporated in a variety of coating systems.

The process of EP0466649 is conducted by stirring the crude 2,9-dichloroquinacridone in a polar solvent, such as N,N,N',N'-tetramethylurea, N,N-dimethylacetamide, N-methylformamide and preferably N,N-dimethylformamide, together with an aliphatic long chain thiol compound, such as such as n-decanethiol, n-dodecanethiol and tert.-dodecanethiol, and a base and heating the mixture to temperatures above 50° C., preferably at reflux temperatures, until the conversion is completed, usually 1 to 24 hours depending on the chosen conditions. Water may be present during the conversion to the platelet form in amounts that don't impair the process. The pigment platelets obtained according to EP0466649 exhibit a length of 1-45 μm, a width of 0.1-20 μm and a thickness of 0.05-5 μm. A particularly preferred pigment contains at least 50% by weight of platelets of 1-20 μm length, 0.1-7 μm width and 0.5-2.0 μm thickness.

It has now been surprisingly discovered that crude 2,9-dichloroquinacridone, known to exist in a needle prismatic particle form having a particle size of 0.01 to 5 μm, can be readily and efficiently converted into an "effect" pigment having a platelet-like form without using an aliphatic long chain thiol compound.

Thus, the present invention is directed to a process for the preparation of the 2,9-dichloroquinacridone of claim 1 in platelet and pigmentary form, which comprises
(a) dispersing and partially dissolving crude 2,9-dichloroquinacridone in a polar solvent in the presence of a base at elevated temperatures,
(b) precipitating the 2,9-dichloroquinacridone in the desired platelet form by adding water and optionally lowering the temperature.

The novel process for preparation of the platelet form of 2,9-dichloroquinacridone is conducted by dispersing and partially dissolving crude 2,9-dichloroquinacridone in a polar solvent in the presence of a base at elevated temperatures. Elevated temperatures mean temperatures from 100° C. to reflux temperature of the solvent, especially from 120° C. to reflux temperature of the solvent. In said process step small amounts of water might be present. The precipitation of the 2,9-dichloroquinacridone in the desired platelet form is achieved by adding water and lowering the temperature, wherein the speed of the addition of water as well as the temperature adjustment are the most critical points. The conversion can be carried out under pressure, although conversion at atmospheric pressure is preferred. It is possible to obtain a 2,9-dichloroquinacridone in a more angular platelet form as compared to that described in EP0466649 by controlling very strictly the recrystallisation, which is achieved by the addition of water as well as by dropping the temperature. After the deposition is complete the suspension is cooled to room temperature, filtered, the filtrate is washed with water to remove the sodium methylate and the pigment is dried.

The starting 2,9-dichloroquinacridone crude is a conventional commercially available acicular (needle prismatic) 2,9-dichloroquinacridone crude having a particle size of 0.01 to 5 μm. Suitable polar solvents are N,N,N',N'-tetramethylurea, N,N-dimethylacetamide, N-methylformamide and N,N-dimethylformamide (DMF) and N-methyl-pyrrolidone (NMP). N,N-dimethylformamide and N-methyl-pyrrolidone are preferred and N-methyl-pyrrolidone is most preferred. The solvent does not have to be free of water. The addition of a small amount of water in step a) turned out to be advantageous.

Suitable bases are alkali metal hydroxides, or methoxides. Bases which prove particularly suitable for this purpose are lithium, sodium, potassium hydroxides and/or their methoxides, preferably sodium methoxide.

The molar ratio of the crude 2,9-dichloroquinacridone to water is from 1:2 to 1:20. If the amount of water is not sufficient, the yield of the 2,9-dichloroquinacridone platelets is poor and unwanted pigment forms (needles) are formed.

The amount of solvent is dependent on the polarity of the solvent and the amount of base used, i.e. the solubility of 2,9-dichloroquinacridone in the alkaline solvent.

If the solvent is NMP, NMP is present in an amount of 3 to 30 parts by weight, especially by 4 to 20 parts by weight, per part of pigment and the base, such as, for example, sodium methoxide, is present in an amount of 0.01 to 1.0 parts by weight, especially by 0.1 to 0.8 parts by weight, per part of pigment.

The novel process for preparation of the platelet form of 2,9-dichloroquinacridone is illustrated in more detail with respect to NMP as solvent, but is not limited thereto.

The base, especially sodium methylate, is mixed with NMP at room temperature. It has turned out advantageously to add a small amount of water before adding the acicular 2,9-dichloroquinacridone crude to the mixture of NMP and sodium methylate. Then the mixture is heated to a temperature of from about 170° C. to reflux temperature of the NMP and is stirred for 0.25 to 8 hours at said temperature. Water is added very slowly within 1 to 3 hours, whereby the temperature of the mixture decreases. At about 130° C. the desired platelet form of 2,9-dichloroquinacridone deposits. After the deposition is complete the suspension is cooled to room temperature, filtered, the filtrate is washed with water to remove the sodium methylate and the pigment is dried.

The precipitation of the 2,9-dichloroquinacridone in the desired platelet form is achieved by adding water and lowering the temperature, wherein the speed of the addition of water as well as the temperature adjustment are the most critical points. Normally a sufficient temperature drop is achieved by the added water, but optionally the heating can be reduced.

The molar ratio of the crude 2,9-dichloroquinacridone to water is 1:2 to 1:20. If the amount of water is not sufficient, the yield of the 2,9-dichloroquinacridone platelets is poor and unwanted pigment forms (needles) are formed.

The amount of pigment, base and solvent are intrinsically linked to the temperature employed in step a) and, hence, the degree of dissolution of the crude 2,9-dichloroquinacridone in the mixture of base and solvent. NMP is generally present in an amount of 3 to 30 parts by weight, especially by 4 to 20 parts by weight, per part of pigment and the base is generally present in an amount of 0.01 to 1.0 parts by weight, especially 0.1 to 0.8 parts by weight, per part of pigment.

The 2,9-dichloroquinacridone in platelet form obtainable according to the invention has a length of 1 to 45 µm, a width of 0.1 to 20 µm and an average thickness of 0.01 to 5 µm, especially 0.03 to <2 µm, very especially 0.03 to 0.200 µm. The 2,9-dichloroquinacridone is free of a $C_6$-$C_{18}$ thiol compound.

A particularly preferred pigment contains at least 50% by weight of platelets of 1 to 20 µm length, 0.1 to 7 µm width and 0.05 to <0.200 µm thickness.

If incorporated in 0.4 mm rolled PVC sheets as illustrated in application example 1, the 2,9-dichloroquinacridone in platelet form obtainable according to the invention (1.0% pigment) is characterized in that the hue-value h in remission is ≦31,
the hue-value h in transmission is ≧351.0, and/or
the lightness L* in transmission is ≧20, if the colouristic is measured on a Minolta CM3610d over Leneta B&W. In a preferred embodiment the chroma C* in transmission is ≧50.

In addition, the b* value of the 2,9-dichloroquinacridone of the present invention decreases and the a* value of the 2,9-dichloroquinacridone of the present invention is the same or increases from an illuminating and viewing angle (aspecular angle) 45°=/110° (+25°) to 45°/90° (+45°). In a preferred embodiment of the present invention the b* value of the 2,9-dichloroquinacridone of the present invention decreases and the a* value of the 2,9-dichloroquinacridone of the present invention increases from an illuminating and viewing angle (aspecular angle) 45°/110° (+25°) to 45°/90° (+45°) to 45°/60° (+75°). The "angle-depending" measurements are effected using a Datacolor FX 10 and Black Leneta cards. While the b* value of the 2,9-dichloroquinacridone of example 1 of EP0466649 also decreases from an illuminating and viewing angle (aspecular angle) 45°/110° (+25°) to 45°/90° (+45°), its a* value decreases from an illuminating and viewing angle (aspecular angle) 45°/110° (+25°) to 45°/90° (+45°). Said difference results in the impression that the 2,9-dichloroquinacridone of the present invention has a deeper/wider colour change.

The 2,9-dichloroquinacridone in platelet form obtainable according to the invention is distinguished from that of EP0466649 in that it has less hiding power (higher transparency) and shows (more) sparkling. In addition, it is characterized by its clear angular platelet form that enables new color effects, its angle dependent color change and its X-ray diffraction pattern. Reference is made to FIGS. 1 to 3.

Figure 1:
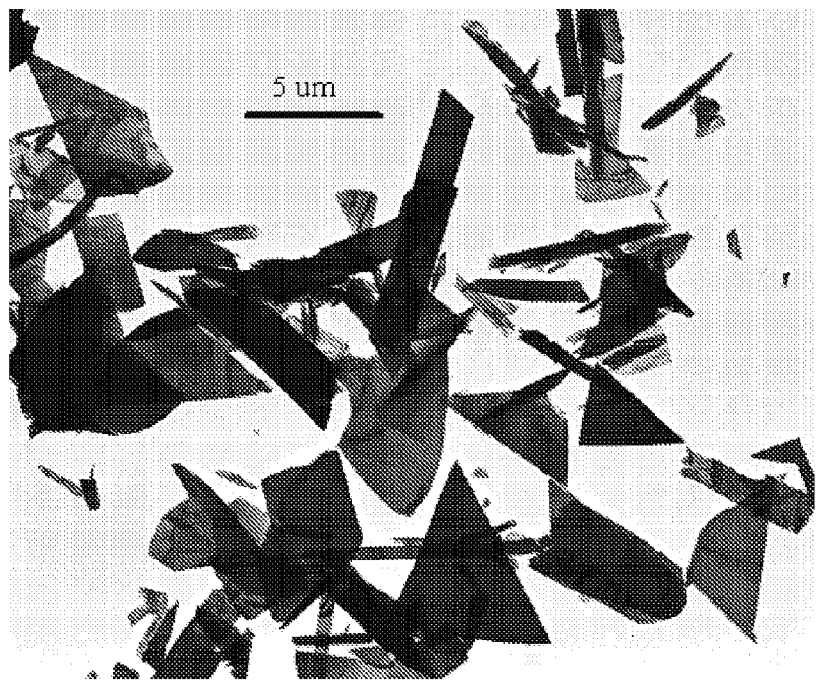
FIG. 1 is a microphotograph of the 2,9-dichloroquinacridone in platelet form obtained in example 1.
Figure 2:
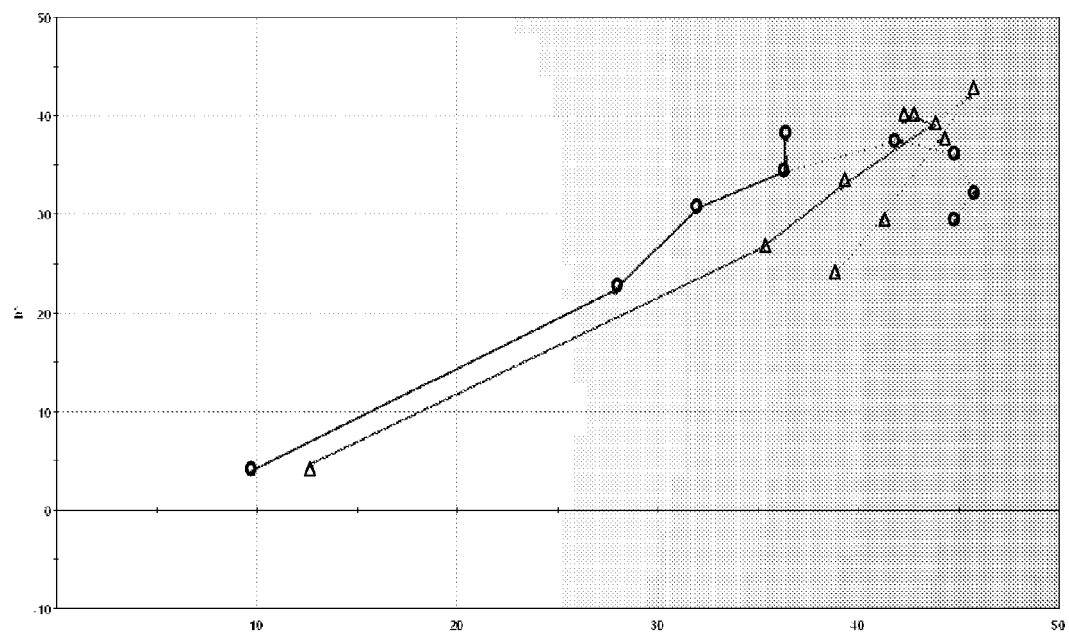
FIG. 2 shows the angle dependent color change of two pigments in the CIELAB color space:
a) 2,9-dichloroquinacridone in platelet form obtained in example 1 of EP0466649,
b) 2,9-dichloroquinacridone in platelet form obtained in example 1 of the present invention.
Figure 3:
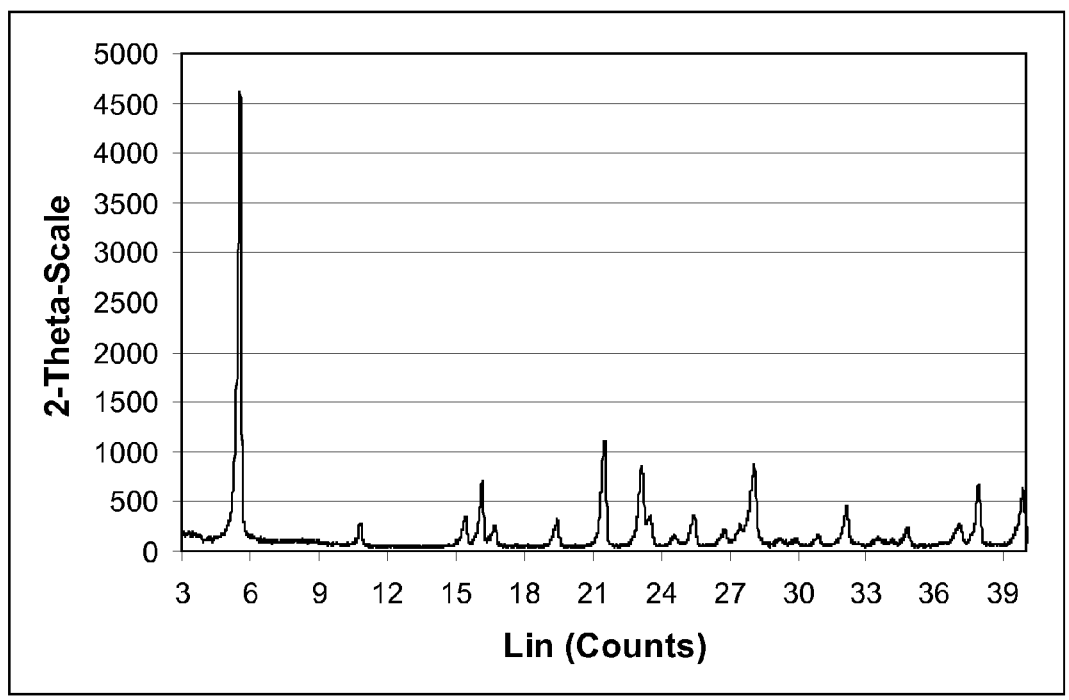
FIG. 3 is an X-ray diffraction pattern of the 2,9-dichloroquinacridone in platelet form obtained in example 1 of the present invention, wherein the x-coordinate represents the 2Θ double glancing angle and the y-coordinate represents the intensity. It may be typical for the 2,9-dichloroquinacridone in platelet form of the present invention that the peak at about 16.2 is equal or larger in height than the peaks at about 15.5 and 16.8, respectively.

The production process of the present invention makes it possible to produce the 2,9-dichloroquinacridone platelets reproducibly in a simple manner in a more angular platelet form. 2,9-dichloroquinacridone platelets of the present invention exhibit a specific shape, a color flop effect and different colors in remission/transmission, when incorporated in plastics and are easy to disperse.

The 2,9-dichloroquinacridone platelets of the present invention are very useful for many purposes, such as coloring plastics, glasses, ceramic products, decorative cosmetic preparations and especially coatings and inks, including printing inks, including security printing inks. All industrially customary printing processes are suitable, for example screen printing, intaglio printing, bronze printing, flexographic printing and offset printing.

For these applications, the pigments of the present invention are also advantageously usable in admixture with transparent and hiding white, color and black pigments and also conventional luster pigments based on metal oxide-coated mica and metal pigments and known (goniochromatic) luster pigments.

The pigments according to the invention can be used for all customary purposes, for example for colouring polymers in the mass, surface coatings (including effect finishes, including those for the automotive sector) and printing inks, and also, for example, for applications in cosmetics. Such applications are known from reference works, for example "Industrielle Organische Pigmente" (W. Herbst and K. Hunger, VCH Verlagsgesellschaft mbH, Weinheim/New York, 2nd, completely revised edition, 1995).

The high molecular weight organic material for the pigmenting of which the pigments or pigment compositions according to the invention may be used may be of natural or synthetic origin. High molecular weight organic materials usually have molecular weights of about from $10^3$ to $10^8$ g/mol or even more. They may be, for example, natural resins, drying oils, rubber or casein, or natural substances derived therefrom, such as chlorinated rubber, oil-modified alkyd resins, viscose, cellulose ethers or esters, such as ethylcellulose, cellulose acetate, cellulose propionate, cellulose acetobutyrate or nitrocellulose, but especially totally synthetic organic polymers (thermosetting plastics and thermoplastics), as are obtained by polymerisation, polycondensation or polyaddition. From the class of the polymerisation resins there may be mentioned, especially, polyolefins, such as polyethylene, polypropylene or polyisobutylene, and also substituted polyolefins, such as polymerisation products of vinyl chloride, vinyl acetate, styrene, acrylonitrile, acrylic acid esters, methacrylic acid esters or butadiene, and also copolymerisation products of the said monomers, such as especially ABS or EVA.

From the series of the polyaddition resins and polycondensation resins there may be mentioned, for example, condensation products of formaldehyde with phenols, so-called phenoplasts, and condensation products of formaldehyde with urea, thiourea or melamine, so-called aminoplasts, and the polyesters used as surface-coating resins, either saturated, such as alkyd resins, or unsaturated, such as maleate resins; also linear polyesters and polyamides, polyurethanes or silicones.

The said high molecular weight compounds may be present singly or in mixtures, in the form of plastic masses or melts. They may also be present in the form of their monomers or in the polymerised state in dissolved form as film-formers or binders for surface coatings or printing inks, such as, for example, boiled linseed oil, nitrocellulose, alkyd resins, melamine resins and urea-formaldehyde resins or acrylic resins.

Depending on the intended purpose, it has proved advantageous to use the pigments or pigment compositions according to the invention as toners or in the form of preparations. Depending on the conditioning method or intended application, it may be advantageous to add certain amounts of texture-improving agents to the pigment before or after the conditioning process, provided that this has no adverse effect on use of the effect pigments for colouring high molecular weight organic materials, especially polyethylene. Suitable agents are, especially, fatty acids containing at least 18 carbon atoms, for example stearic or behenic acid, or amides or metal salts thereof, especially magnesium salts, and also plasticisers, waxes, resin acids, such as abietic acid, rosin soap, alkylphenols or aliphatic alcohols, such as stearyl alcohol, or aliphatic 1,2-dihydroxy compounds containing from 8 to 22 carbon atoms, such as 1,2-dodecanediol, and also modified colophonium maleate resins or fumaric acid colophonium resins. The texture-improving agents are added in amounts of preferably from 0.1 to 30% by weight, especially from 2 to 15% by weight, based on the end product.

The pigments according to the invention can be added in any tinctorially effective amount to the high molecular weight organic material being pigmented. A pigmented substance composition comprising a high molecular weight organic material and from 0.01 to 80% by weight, preferably from 0.1 to 30% by weight, based on the high molecular weight organic material, of an pigment according to the invention is advantageous. Concentrations of from 1 to 20% by weight, especially of about 10% by weight, can often be used in practice. High concentrations, for example those above 30% by weight, are usually in the form of concentrates ("masterbatches") which can be used as colorants for producing pigmented materials having a relatively low pigment content, the pigments according to the invention having an extraordinarily low viscosity in customary formulations so that they can still be processed well.

For the purpose of pigmenting organic materials, the pigments according to the invention may be used singly. It is, however, also possible, in order to achieve different hues or colour effects, to add any desired amounts of other colour-imparting constituents, such as white, coloured, black or effect pigments, to the high molecular weight organic substances in addition to the effect pigments according to the invention. When coloured pigments are used in admixture with the effect pigments according to the invention, the total amount is preferably from 0.1 to 10% by weight, based on the high molecular weight organic material. The pigmenting of high molecular weight organic substances with the pigments according to the invention is carried out, for example, by admixing such a pigment, where appropriate in the form of a masterbatch, with the substrates using roll mills or mixing or grinding apparatuses. The pigmented material is then brought into the desired final form using methods known per se, such as calendering, compression moulding, extrusion, coating, pouring or injection moulding. Any additives customary in the plastics industry, such as plasticisers, fillers or stabilisers, can be added to the polymer, in customary amounts, before or after incorporation of the pigment. In particular, in order to produce non-rigid shaped articles or to reduce their brittleness, it is desirable to add plasticisers, for example esters of phosphoric acid, phthalic acid or sebacic acid, to the high molecular weight compounds prior to shaping. The 2,9-dichloroquinacridone platelets and the organic pigment can be present in the same layer of a lacquer system, but enhanced effects can be achieved in a three layer system, where the organic pigment is contained in the base coat and the 2,9-dichloroquinacridone platelets are contained in the intermediate coat between base coat and the clear coat.

For pigmenting surface coatings and printing inks, the high molecular weight organic materials and the pigments according to the invention, where appropriate together with customary additives such as, for example, fillers, other pigments, siccatives or plasticisers, are finely dispersed or dissolved in the same organic solvent or solvent mixture, it being possible for the individual components to be dissolved or dispersed separately or for a number of components to be dissolved or dispersed together, and only thereafter for all the components to be brought together.

Dispersing an pigment according to the invention in the high molecular weight organic material being pigmented, and processing a pigment composition according to the invention, are preferably carried out subject to conditions under which only relatively weak shear forces occur so that the effect pigment is not broken up into smaller portions.

The colorations obtained, for example in plastics, surface coatings or printing inks, especially in surface coatings or printing inks, more especially in surface coatings, are distinguished by excellent properties, especially by extremely high saturation, outstanding fastness properties, angle dependent color change (flop) and different colors in remission and transmission, when used in plastics.

When the high molecular weight material being pigmented is a surface coating, it is especially a specialty surface coating, very especially an automotive finish.

Owing to its uncopyable optical effects, the pigment according to the invention is advantageously used for the production of forgery-proof materials from paper and plastic. The term forgery-proof materials made from paper is taken to mean, for example, documents of value, such as banknotes, cheques, tax stamps, postage stamps, rail and air tickets, lottery tickets, gift certificates, entry cards, forms and shares. The term forgery-proof materials made from plastic is taken to mean, for example, cheque cards, credit cards, telephone cards and identity cards. In order to obtain an optimum optical effect, it should be ensured during processing that the platelet-shaped pigment is well oriented, i.e. is aligned as parallel as possible to the surface of the respective medium. This parallel orientation of the pigment particles is best carried out from a flow process, and is generally achieved in all known methods of plastic processing, painting, coating and printing.

The pigments according to the invention are also suitable for making-up the lips or the skin and for colouring the hair or the nails.

The invention accordingly relates also to a cosmetic preparation or formulation comprising from 0.0001 to 90% by weight a pigment according to the invention and from 10 to 99.9999% of a cosmetically suitable carrier material, based on the total weight of the cosmetic preparation or formulation.

Such cosmetic preparations or formulations are, for example, lipsticks, blushers, foundations, nail varnishes and hair shampoos.

The pigments may be used singly or in the form of mixtures. It is, in addition, possible to use pigments according to the invention together with other pigments and/or colorants, for example in combinations as described hereinbefore or as known in cosmetic preparations.

The cosmetic preparations and formulations according to the invention preferably contain the pigment according to the invention in an amount from 0.005 to 50% by weight, based on the total weight of the preparation.

Suitable carrier materials for the cosmetic preparations and formulations according to the invention include the customary materials used in such compositions.

The cosmetic preparations and formulations according to the invention may be in the form of, for example, sticks, ointments, creams, emulsions, suspensions, dispersions, powders or solutions. They are, for example, lipsticks, mascara preparations, blushers, eye-shadows, foundations, eyeliners, powder or nail varnishes.

If the preparations are in the form of sticks, for example lipsticks, eye-shadows, blushers or foundations, the preparations consist for a considerable part of fatty components, which may consist of one or more waxes, for example ozokerite, lanolin, lanolin alcohol, hydrogenated lanolin, acetylated lanolin, lanolin wax, beeswax, candelilla wax, microcrystalline wax, carnauba wax, cetyl alcohol, stearyl alcohol, cocoa butter, lanolin fatty acids, petrolatum, petroleum jelly, mono-, di- or tri-glycerides or fatty esters thereof that are solid at 25° C., silicone waxes, such as methyloctadecaneoxypolysiloxane and poly(dimethylsiloxy)-stearoxysiloxane, stearic acid monoethanolamine, colophane and derivatives thereof, such as glycol abietates and glycerol abietates, hydrogenated oils that are solid at 25° C., sugar glycerides and oleates, myristates, lanolates, stearates and dihydroxystearates of calcium, magnesium, zirconium and aluminium.

The fatty component may also consist of a mixture of at least one wax and at least one oil, in which case the following oils, for example, are suitable: paraffin oil, purcelline oil, perhydrosqualene, sweet almond oil, avocado oil, calophyllum oil, castor oil, sesame oil, jojoba oil, mineral oils having a boiling point of about from 310 to 410° C., silicone oils, such as dimethylpolysiloxane, linoleyl alcohol, linolenyl alcohol, oleyl alcohol, cereal grain oils, such as wheatgerm oil, isopropyl lanolate, isopropyl palmitate, isopropyl myristate, butyl myristate, cetyl myristate, hexadecyl stearate, butyl stearate, decyl oleate, acetyl glycerides, octanoates and decanoates of alcohols and polyalcohols, for example of glycol and glycerol, ricinoleates of alcohols and polyalcohols, for example of cetyl alcohol, isostearyl alcohol, isocetyl lanolate, isopropyl adipate, hexyl laurate and octyl dodecanol.

The fatty components in such preparations in the form of sticks may generally constitute up to 99.91% by weight of the total weight of the preparation.

The cosmetic preparations and formulations according to the invention may additionally comprise further constituents, such as, for example, glycols, polyethylene glycols, polypropylene glycols, monoalkanolamides, non-coloured polymeric, inorganic or organic fillers, preservatives, UV filters or other adjuvants and additives customary in cosmetics, for example a natural or synthetic or partially synthetic di- or tri-glyceride, a mineral oil, a silicone oil, a wax, a fatty alcohol, a Guerbet alcohol or ester thereof, a lipophilic functional cosmetic active ingredient, including sun-protection filters, or a mixture of such substances.

A lipophilic functional cosmetic active ingredient suitable for skin cosmetics, an active ingredient composition or an active ingredient extract is an ingredient or a mixture of ingredients that is approved for dermal or topical application. The following may be mentioned by way of example:

active ingredients having a cleansing action on the skin surface and the hair; these include all substances that serve to cleanse the skin, such as oils, soaps, synthetic detergents and solid substances;

active ingredients having a deodorising and perspiration-inhibiting action: they include antiperspirants based on aluminium salts or zinc salts, deodorants comprising bactericidal or bacteriostatic deodorising substances, for example triclosan, hexachlorophene, alcohols and cationic substances, such as, for example, quaternary ammonium salts, and odour absorbers, for example ®Grillocin (combination of zinc ricinoleate and various additives) or triethyl citrate (optionally in combination with an antioxidant, such as, for example, butyl hydroxytoluene) or ion-exchange resins;

active ingredients that offer protection against sunlight (UV filters): suitable active ingredients are filter substances (sunscreens) that are able to absorb UV radiation from sunlight and convert it into heat; depending on the desired action, the following light-protection agents are preferred: light-protection agents that selectively absorb sunburn-causing high-energy UV radiation in the range of approximately from 280 to 315 nm (UV-B absorbers) and transmit the longer-wavelength range of, for example, from 315 to 400 nm (UV-A range), as well as light-protection agents that absorb only the longer-wavelength radiation of the UV-A range of from 315 to 400 nm (UV-A absorbers); suitable light-protection agents are, for example, organic UV absorbers from the class of the p-aminobenzoic acid derivatives, salicylic acid derivatives, benzophenone derivatives, dibenzoylmethane derivatives, diphenyl acrylate derivatives, benzofuran derivatives, polymeric UV absorbers comprising one or more organosilicon radicals, cinnamic acid derivatives, camphor derivatives, trianilino-s-triazine derivatives, phenyl-benzimidazolesulfonic acid and salts thereof, menthyl anthranilates, benzotriazole derivatives, and/or an inorganic micropigment selected from aluminium oxide- or silicon dioxide-coated $TiO_2$, zinc oxide or mica;

active ingredients against insects (repellents) are agents that are intended to prevent insects from touching the skin and becoming active there; they drive insects away and evaporate slowly; the most frequently used repellent is diethyl toluamide (DEET); other common repellents will be found, for example, in "Pflegekosmetik" (W. Raab and U. Kindl, Gustav-Fischer-Verlag Stuttgart/New York, 1991) on page 161;

active ingredients for protection against chemical and mechanical influences: these include all substances that form a barrier between the skin and external harmful substances, such as, for example, paraffin oils, silicone oils, vegetable oils, PCL products and lanolin for protection against aqueous solutions, film-forming agents, such as sodium alginate, triethanolamine alginate, polyacrylates, polyvinyl alcohol or cellulose ethers for protection against the effect of organic solvents, or substances based on mineral oils, vegetable oils or silicone oils as "lubricants" for protection against severe mechanical stresses on the skin;

moisturising substances: the following substances, for example, are used as moisture-controlling agents (moisturisers): sodium lactate, urea, alcohols, sorbitol, glycerol, propylene glycol, collagen, elastin and hyaluronic acid;

active ingredients having a keratoplastic effect: benzoyl peroxide, retinoic acid, colloidal sulfur and resorcinol;

antimicrobial agents, such as, for example, triclosan or quaternary ammonium compounds;

oily or oil-soluble vitamins or vitamin derivatives that can be applied dermally: for example vitamin A (retinol in the form of the free acid or derivatives thereof), panthenol, pantothenic acid, folic acid, and combinations thereof, vitamin E (tocopherol), vitamin F; essential fatty acids; or niacinamide (nicotinic acid amide);

vitamin-based placenta extracts: active ingredient compositions comprising especially vitamins A, C, E, $B_1$, $B_2$, $B_6$, $B_{12}$, folic acid and biotin, amino acids and enzymes as well as compounds of the trace elements magnesium, silicon, phosphorus, calcium, manganese, iron or copper;

skin repair complexes: obtainable from inactivated and disintegrated cultures of bacteria of the bifidus group;

plants and plant extracts: for example arnica, aloe, beard lichen, ivy, stinging nettle, ginseng, henna, camomile, marigold, rosemary, sage, horsetail or thyme;

animal extracts: for example royal jelly, propolis, proteins or thymus extracts;

cosmetic oils that can be applied dermally: neutral oils of the Miglyol 812 type, apricot kernel oil, avocado oil, babassu oil, cottonseed oil, borage oil, thistle oil, groundnut oil, gamma-oryzanol, rosehip-seed oil, hemp oil, hazelnut oil, blackcurrant-seed oil, jojoba oil, cherry-stone oil, salmon oil, linseed oil, cornseed oil, macadamia nut oil, almond oil, evening primrose oil, mink oil, olive oil, pecan nut oil, peach kernel oil, pistachio nut oil, rape oil, rice-seed oil, castor oil, safflower oil, sesame oil, soybean oil, sunflower oil, tea tree oil, grapeseed oil or wheatgerm oil.

The preparations in stick form are preferably anhydrous but may in certain cases comprise a certain amount of water which, however, in general does not exceed 40% by weight, based on the total weight of the cosmetic preparation.

If the cosmetic preparations and formulations according to the invention are in the form of semi-solid products, that is to say in the form of ointments or creams, they may likewise be anhydrous or aqueous. Such preparations and formulations are, for example, mascaras, eyeliners, foundations, blushers, eye-shadows, or compositions for treating rings under the eyes.

If, on the other hand, such ointments or creams are aqueous, they are especially emulsions of the water-in-oil type or of the oil-in-water type that comprise, apart from the pigment, from 1 to 98.8% by weight of the fatty phase, from 1 to 98.8% by weight of the aqueous phase and from 0.2 to 30% by weight of an emulsifier.

Such ointments and creams may also comprise further conventional additives, such as, for example, perfumes, antioxidants, preservatives, gel-forming agents, UV filters, colorants, pigments, pearlescent agents, non-coloured polymers as well as inorganic or organic fillers.

If the preparations are in the form of a powder, they consist substantially of a mineral or inorganic or organic filler such as, for example, talcum, kaolin, starch, polyethylene powder or polyamide powder, as well as adjuvants such as binders, colorants etc.

Such preparations may likewise comprise various adjuvants conventionally employed in cosmetics, such as fragrances, antioxidants, preservatives etc.

If the cosmetic preparations and formulations according to the invention are nail varnishes, they consist essentially of nitrocellulose and a natural or synthetic polymer in the form of a solution in a solvent system, it being possible for the solution to comprise other adjuvants, for example pearlescent agents.

In that embodiment, the coloured polymer is present in an amount of approximately from 0.1 to 5% by weight.

The cosmetic preparations and formulations according to the invention may also be used for colouring the hair, in which case they are used in the form of shampoos, creams or gels that are composed of the base substances conventionally employed in the cosmetics industry and a pigment according to the invention.

The cosmetic preparations and formulations according to the invention are prepared in conventional manner, for example by mixing or stirring the components together, optionally with heating so that the mixtures melt.

Various features and aspects of the present invention are illustrated further in the examples that follow. While these examples are presented to show one skilled in the art how to operate within the scope of this invention, they are not to serve as a limitation on the scope of the invention where such scope is only defined in the claims. Unless otherwise indicated in the following examples and elsewhere in the specification and claims, all parts and percentages are by weight, temperatures are in degrees centigrade and pressures are at or near atmospheric.

EXAMPLES

The analytical samples for measuring the hue-value h, the lightness L* and the saturation C* and also the hiding power ΔE*-S/W are prepared according to DIN 53 775 part 7 using pressed PVC plates (0.4 mm thick) containing 1.0% by weight of the 2,9-dichloroquinacridone pigment in platelet form.

The hiding power ΔE*-S/W is measured according to DIN 55984.

All colour measurements in remission/transmission are effected using a Minolta CM 3610d spectrophotometer (d/8 geometry, including the gloss, illuminant D65, observer 10°) and Black & White Leneta cards. All "angle-depending"

measurements are effected using a Datacolor FX 10 above Black Leneta cards. Reference is made to DataColor, Fx 10, Firmenprospekt:

| Illuminating and Viewing Angles | Illuminating Angle[1] | Viewing Angle[2] (Aspecular Angle) |
|---|---|---|
| ASTM angle[3] | 25° | 170° (−15°) |
| ASTM angle[3] | 25° | 140° (+15°) |
| ASTM angle[3] | 45° | 150° (−15°) |
| ASTM angle[3] | 45° | 120° (+15°) |
| ASTM angle[3] | 75° | 120° (−15°) |
| ASTM angle[3] | 75° | 90° (+15°) |
| ASTM/DIN angle[3] | 45° | 110° (+25°) |
| ASTM/DIN angle[3] | 45° | 90° (+45°) |
| ASTM/DIN angle[3] | 45° | 60° (+75°) |
| ASTM/DIN angle[3] | 45° | 25° (+110°) |

[1] 0° (left) to 180° (right) at the plane of the sample surface.
[2] 90° is the normal to the sample surface.
[3] ASTM E2194 Standard Practice for Multi-angle Color Measurement of Metal Flake Pigmented Materials; DIN 6175-2 Tolerances for automotive paint - Part 2: Goniochromatic paints.

The X-ray spectra are determined according to conventional methods using a Siemens D500 X-ray diffractometer ($CuK_\alpha$ radiation).

Example 1

10 g 2,9 dichloroquinacridone in crude form as well as 3.3 g of sodium methylate are dispersed in 66 ml of N-methyl-pyrrolidone (NMP) for 15 minutes. After adding 0.15 ml of water, the mixture is heated up to 175° C. This temperature is kept for 2 additional hours. Afterwards, 25 ml of cold water are dosed to the hot reaction in 90 minutes, whereby the temperature is slowly dropping. At about 130° C., all the pigment is precipitated in the desired platelet form. The mixture is then cooled down to room temperature using an external water bath and is filtered and dried.

Example 2

10 g 2,9 dichloroquinacridone in crude form as well as 4.3 g of sodium methylate are dispersed in 100 ml of dimethyl-formamide (DMF) for 15 minutes. After adding 0.25 ml of water, the mixture is heated up to 137° C. This temperature is kept for 6 additional hours, whereby platelets are already formed. Afterwards, 58 ml of cold water are dosed to the hot reaction in 20 minutes in order to complete the forming of the platelets. The mixture is then cooled down to room temperature using an external water bath and is filtered and dried.

Comparative Example 1

Example 1 of EP0466649

A 1 liter flask equipped with thermometer, stirrer and condenser is flushed with nitrogen and then charged with 190 ml technical N,N-dimethylformamide, 36 ml dodecanethiol-1, 19.0 grams 2,9-dichloroquinacridone crude and 8.1 grams sodium methoxide. The latter are stirred and heated to reflux, whereby the pigment is almost completely dissolved giving a bluish solution. During the 8 hour reflux period, platelets of 2,9-dichloroquinacridone having a copper bronze metallic appearance crystallize out of solution. The suspension is cooled to room temperature and the new platelet pigment is isolated by filtration. The presscake is washed with methanol followed by water and dried at 100° C., affording 18.5 grams lustrous pigment of the following dimensions: length 3-25 µm, width 1-10 µm, thickness 0.05-2 µm.

Application Example 1

Measurement of the Hue Angle (Hue-Value) h, the Lightness L* and the Chroma C* of 0.4 mm Rolled PVC Sheets:

Premix:

0.4 g Pigment is mixed for 30 minutes with 14.0 g of a base mixture and then slowly stirred with 26.0 g of polyvinyl chloride (PVC) (EVIPOL® SH 7020, EVC GmbH). The base mixture consists of plastiziser (12.9 g Palatinol® 10P (di-2-propylheptylphthalate, BASF), 0.6 g Drapex® 39 (epoxidised soya bean oil, Witco Vinyl Additives GmbH) and 0.5 g Mark BZ 561 (Crompton Vinyl Additives GmbH).

Production of Rolled Sheets:

The mixture of PVC and pigment/base mixture obtained above is rolled in a 2-roll mill (Collin model, D-85560 Ebersberg) at a roll temperature of 160° C. (each roll) in accordance with the following:

a) hot-rolling for 6 minutes (rolled sheet turned every minute, roll nip 0.35 mm).

The remission data of the pigments obtained in examples 1 and 2 and comparative example 1 in a PVC film (1% pigment) are given below.

|  | L* | C* | h |
|---|---|---|---|
| Pigment obtained in example 1 | 40.1 | 44.7 | 29.5 |
| Pigment obtained in example 2 | 35.0 | 31.0 | 25.8 |
| Pigment obtained in comparative example 1 | 40.7 | 42.9 | 31.7 |
| CINQUASIA Magenta RT-243-D[1] | 30.7 | 27.0 | 15.2 |
| Starting acicular pigment crude | 37.4 | 43.5 | 22.9 |

[1] Commercial acicular 2,9 dichloroquinacridone available from Ciba Speciality Chemicals)

The transmission data of the pigments obtained in examples 1 and 2 and comparative example 1 in a PVC film (1% pigment) are given below.

|  | L* | C* | h |
|---|---|---|---|
| Pigment obtained in example 1 | 22.0 | 54.1 | 356.3 |
| Pigment obtained in example 2 | 21.6 | 48.1 | 353.3 |
| Pigment obtained in comparative example 1 | 19.1 | 52.4 | 350.1 |
| CINQUASIA Magenta RT-243-D[1] | 24.0 | 60.2 | 11.3 |
| Starting acicular pigment crude | 18.3 | 51.8 | 354.8 |

[1] Commercial acicular 2,9 dichloroquinacridone available from Ciba Speciality Chemicals)

Application Example 2

Colour characteristics of the pigments obtained in examples 1 and 2 as well as comparative example 1 (CIELAB—L*, C*, h; or L*, a*, b*) on the basis of the same 1% PVC-sheets as in application example 1 above Black Leneta-cards:

| 2,9 dichloroquinacridone in platelet form obtained in Example 1: | | | |
|---|---|---|---|
| Angles** | L* | C* | H* |
| 25°/170° (−15°) | 38.54 | 10.52 | 22.47 |
| 25°/140° (+15°) | 52.46 | 35.62 | 38.60 |

-continued

| | | | |
|---|---|---|---|
| 45°/150° (−15°) | 52.03 | 44.32 | 43.75 |
| 45°/120° (+15°) | 50.21 | 49.99 | 43.32 |
| 75°/120° (−15°) | 46.47 | 52.38 | 46.06 |
| 75°/90° (+15°) | 42.48 | 50.08 | 43.33 |
| 45°/110° (+25°) | 37.88 | 56.34 | 41.70 |
| 45°/90° (+45°) | 27.86 | 57.47 | 38.65 |
| 45°/60° (+75°) | 22.89 | 55.95 | 35.18 |
| 45°/25° (+110°) | 21.33 | 53.58 | 33.27 |

| Angles** | L* | a* | b* |
|---|---|---|---|
| 25°/170° (−15°) | 38.54 | 09.72 | 04.02 |
| 25°/140° (+15°) | 52.45 | 27.84 | 22.22 |
| 45°/150° (−15°) | 52.03 | 32.02 | 30.65 |
| 45°/120° (+15°) | 50.21 | 36.37 | 34.29 |
| 75°/120° (−15°) | 46.47 | 36.34 | 37.72 |
| 75°/90° (+15°) | 42.48 | 36.43 | 34.37 |
| 45°/110° (+25°) | 37.88 | 42.06 | 37.48 |
| 45°/90° (+45°) | 27.86 | 44.88 | 35.89 |
| 45°/60° (+75°) | 22.89 | 45.73 | 32.24 |
| 45°/25° (+110°) | 21.33 | 44.79 | 29.39 |

2,9 dichloroquinacridone in platelet form obtained in example 2:

| Angles** | L* | C* | H* |
|---|---|---|---|
| 25°/170° (−15°) | 29.66 | 10.42 | 16.58 |
| 25°/140° (+15°) | 40.97 | 30.97 | 32.04 |
| 45°/150° (−15°) | 41.85 | 37.55 | 37.52 |
| 45°/120° (+15°) | 39.12 | 41.77 | 37.87 |
| 75°/120° (−15°) | 37.85 | 42.95 | 41.00 |
| 75°/90° (+15°) | 32.90 | 41.82 | 39.07 |
| 45°/110° (+25°) | 29.27 | 47.16 | 39.49 |
| 45°/90° (+45°) | 21.66 | 45.75 | 36.58 |
| 45°/60° (+75°) | 18.09 | 43.23 | 33.19 |
| 45°/25° (+110°) | 16.84 | 40.73 | 30.88 |

| Angles** | L* | a* | b* |
|---|---|---|---|
| 25°/170° (−15°) | 29.66 | 09.98 | 02.97 |
| 25°/140° (+15°) | 40.97 | 26.26 | 16.43 |
| 45°/150° (−15°) | 41.85 | 29.78 | 22.87 |
| 45°/120° (+15°) | 39.12 | 32.97 | 25.64 |
| 75°/120° (−15°) | 37.85 | 32.41 | 28.18 |
| 75°/90° (+15°) | 32.90 | 32.47 | 26.36 |
| 45°/110° (+25°) | 29.27 | 36.39 | 29.99 |
| 45°/90° (+45°) | 21.66 | 36.74 | 27.27 |
| 45°/60° (+75°) | 18.09 | 36.18 | 23.66 |
| 45°/25° (+110°) | 16.84 | 34.95 | 20.90 |

2,9 dichloroquinacridone in platelet form obtained in comparative example 1:

| Angles** | L* | C* | H* |
|---|---|---|---|
| 25°/170° (−15°) | 40.57 | 13.43 | 19.83 |
| 25°/140° (+15°) | 54.44 | 44.09 | 37.09 |
| 45°/150° (−15°) | 56.46 | 51.04 | 39.95 |
| 45°/120° (+15°) | 54.17 | 58.63 | 41.83 |
| 75°/120° (−15°) | 52.75 | 58.49 | 42.88 |
| 75°/90° (+15°) | 47.54 | 57.82 | 43.06 |
| 45°/110° (+25°) | 43.45 | 61.89 | 42.69 |
| 45°/90° (+45°) | 29.65 | 57.76 | 40.43 |
| 45°/60° (+75°) | 20.12 | 50.62 | 35.61 |
| 45°/25° (+110°) | 17.19 | 45.71 | 31.67 |

| Angles** | L* | a* | b* |
|---|---|---|---|
| 25°/170° (−15°) | 40.57 | 12.63 | 04.56 |
| 25°/140° (+15°) | 54.44 | 35.17 | 26.59 |
| 45°/150° (−15°) | 56.46 | 39.13 | 32.77 |
| 45°/120° (+15°) | 54.17 | 43.68 | 39.10 |
| 75°/120° (−15°) | 52.75 | 42.86 | 39.80 |
| 75°/90° (+15°) | 47.54 | 42.24 | 39.48 |
| 45°/110° (+25°) | 43.45 | 45.48 | 41.96 |
| 45°/90° (+45°) | 29.65 | 43.97 | 37.46 |
| 45°/60° (+75°) | 20.12 | 41.07 | 29.42 |
| 45°/25° (+110°) | 17.19 | 38.90 | 24.00 |

**Illuminating Angle/Viewing Angle (Aspecular Angle).

The invention claimed is:

1. A 2,9-dichloroquinacridone in platelet form having a length of 1 to 45 μm, a width of 0.1 to 20 μm and an average thickness of 0.01 to 5 μm, which 2,9-dichloroquinacridone has a hue-value h in remission is ≦31 and/or a lightness L* in transmission of ≧20 and/or a decreasing b* value and an increasing a* value from an illuminating and viewing angle (aspecular angle) 45°/110° (+25°) to 45°/90° (+45°).

2. A process for the preparation of the 2,9-dichloroquinacridone of claim 1 in platelet and pigmentary form, which comprises
(a) dispersing and partially dissolving crude 2,9-dichloroquinacridone in a polar solvent in presence of a base at elevated temperatures, (
b) precipitating the 2,9-dichloroquinacridone in the desired platelet form by adding water and optionally lowering the temperature.

3. The process of claim 2, wherein said base is an alkali metal hydroxide or methoxide.

4. The process of claim 2, wherein said polar solvent is selected from the group consisting of N,N,N',N'-tetramethylurea, N,N-dimethylacetamide, N-methylformamide, N,N-dimethylformamide (DMF) and N-methyl-pyrrolidone (NMP).

5. The process of claim 4, wherein the solvent is N-methylpyrrolidone, which is heated up to 150° C. to reflux temperature in step (a).

6. The process of claim 5, wherein the temperature in step (b) is dropped to 100 to 120° C.

7. The process of claim 2, wherein; the molar ratio of the crude 2,9-dichloroquinacridone to water is 1:2 to 1:20.

8. A 2,9-dichloroquinacridone in platelet form obtained according to the process of claim 2.

9. A high molecular weight organic material containing an effective coloring amount of the 2,9-dichloroquinacridone platelets of claim 1.

10. A method for coloring high molecular weight organic material which comprises incorporating an effective coloring amount of the 2,9-dichloroquinacridone platelets of claim 1 into said organic material.

11. A 2,9-dichloroquinacridone in platelet form according to claim 1, wherein the average thickness is from 0.03 to 0.200 μm.

12. The process of claim 2, wherein said base is an alkali metal hydroxide or methoxide and said polar solvent is selected from the group consisting of N,N,N',N'-tetramethylurea, N,N-dimethylacetamide, N-methylformamide, N,N-dimethylformamide (DMF) and N-methyl-pyrrolidone (NMP).

13. A 2,9-dichloroquinacridone in platelet form obtained according to the process of claim 7.

14. A 2,9-dichloroquinacridone in platelet form obtained according to the process of claim 12.

15. A high molecular weight organic material containing an effective coloring amount of the 2,9-dichloroquinacridone platelets of claim 8.

16. A high molecular weight organic material containing an effective coloring amount of the 2,9-dichloroquinacridone platelets of claim 11.

* * * * *